(12) United States Patent
Lee et al.

(10) Patent No.: US 6,944,405 B2
(45) Date of Patent: Sep. 13, 2005

(54) BIT-RATE-INDEPENDENT OPTICAL CROSS-CONNECT DEVICE IN OPTICAL TRANSMISSION SYSTEM

(75) Inventors: Han-Lim Lee, Yongin-shi (KR);
Byung-Jik Kim, Songnam-shi (KR);
Jun-Ho Koh, Songnam-shi (KR);
Seong-Taek Hwang, Pyeongtaek-shi (KR); Yun-Je Oh, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 690 days.

(21) Appl. No.: 09/953,637

(22) Filed: Sep. 17, 2001

(65) Prior Publication Data

US 2002/0033978 A1 Mar. 21, 2002

(30) Foreign Application Priority Data

Sep. 16, 2000 (KR) ........................................ 2000-54478

(51) Int. Cl.[7] ........................ H04B 10/00; H04B 10/08; H04B 17/00
(52) U.S. Cl. ........................... 398/154; 398/155; 398/27
(58) Field of Search .......................... 398/27, 154, 155; 375/224; 370/352

(56) References Cited

U.S. PATENT DOCUMENTS 6,549,572 B1 * 4/2003 Anderson et al. .......... 375/225

2001/0046076 A1 * 11/2001 Kim et al. .................. 359/124
2003/0161635 A1 * 8/2003 Milton et al. ................ 398/79

* cited by examiner

*Primary Examiner*—M. R. Sedighian
*Assistant Examiner*—Nathan Curs
(74) *Attorney, Agent, or Firm*—Cha & Reiter, L.L.C.

(57) ABSTRACT

This invention provides an optical transmission with a demultiplexer for demultiplexing an input optical signal into optical signals of different channels and a multiplexer for multiplexing the optical signals outputted from the demultiplexer. The optical cross-connect device includes: N BICDR (Bit Rate Independent Clock and Data Recovery) receivers each for receiving the associated optical signals outputted from the demultiplexer, for converting the associated optical signal into an electrical signal and reproducing clocks and data based on the bit rate of the electrical signal; a switchboard with a cross-connect switch for receiving output signals from the respective N BICDR receiver; N bit rate discriminating units for receiving the output signals from the N BICDR receivers, respectively, thereby outputting bit rate discriminating signals associated with the N BICDR receivers, respectively; a temperature sensing unit for outputting a temperature sensing signal; and, a central processing unit for receiving the bit rate discriminating signals from the N bit rate discriminating unit, along with the temperature sensing signal from the temperature sensing unit, for compensating each of the received bit rate discriminating signals with a temperature-dependent bit rate value read out, based on the temperature sensing signal, from a memory, and for controlling the bit rate of the associated BICDR receiver based on the compensated bit rate.

5 Claims, 2 Drawing Sheets

FIG. 1 [PRIOR ART]

BIT-RATE-INDEPENDENT OPTICAL CROSS-CONNECT DEVICE IN OPTICAL TRANSMISSION SYSTEM

CLAIM OF PRIORITY

This application makes reference to and claims all benefits accruing under 35 U.S.C. Section 119 from an application entitled, "BIT-RATE-INDEPENDENT OPTICAL CROSS-CONNECT DEVICE IN OPTICAL TRANSMISSION SYSTEM," filed in the Korean Industrial Property Office on Sep. 16, 2000, and there duly assigned Serial No. 00-54478.

BACKGROUND OF THE INVENTION

1. Field of the Invention

The present invention relates to an optical cross-connect device in an optical transmission system, and, more particularly, to a bit-rate-independent optical cross-connect device.

2. Description of the Related Art

A light transmission system can adopt various protocols, such as FDDI (Fiber Distributed Data Interface), ESCON (Enterprise Systems Connectivity), Fiber Channel, Gigabit Ethernet, and ATM (Asynchronous Transfer Mode) for high-bandwidth and high-bit-rate bit-rate communications. Fiber optics technology can adopt various bit rates of 125 Mb/s, 155 Mb/s, 200 Mb/s, 622 Mb/s, 1062 Mb/s, 1.25 Gb/s, and 2.5 Gb/s to supply the capacity to meet the demand for multimedia applications.

In operation, the light transmission system adopts one set of protocols as a multiplexing format for using any number of bit rates. In this type of light transmission system, the bit rate of an optical signal is set previously to a specific rate, such that an optical receiver can be designed to match the incoming bit rate. The function of an optical receiver is to convert an input optical signal into an electric signal and thereafter restore the electric signal to the original data that is noise-free.

FIG. 1 is a block diagram illustrating a conventional optical cross-connect device using an electrical switch in an optical transmission system. As shown in FIG. 1, the optical transmission system includes: a demultiplexer (DMUX) 106 for demultiplexing an input optical signal into optical signals of different channels; a plurality of fixed bit-rate optoelectric converters 102 for converting the respective optical signal channel outputted from the demultiplexer 106 into electrical signals; and, an N×N optical cross-connect switch 103 for receiving the electrical signals outputted from the optoelectric converters 102 and routing the received electrical signals to the intended path. The optical cross-connect device also includes a plurality of bit-rate-fixed electro-optic converter 104 for converting the electrical signals that are outputted from the respective output port of the optical cross-connect switch 103 into optical signals, and a multiplexer 107 for multiplexing the optical signals outputted from the bit-rate-fixed electro-optic converter 104 via a single optical fiber. The optical cross-connect switch 103 is connected to a controller 108 for controlling the input and output of data therefrom.

Now, the operation of the conventional optical cross-connect device with the above-mentioned configuration will be described.

The input optical signal is first applied to the demultiplexer 106, which demultiplexes the optical signal into different wavelengths. The optical signals outputted from the demultiplexer 106 are applied to the input terminals of the optoelectric converters 102, each supporting only a specific fixed bit rate. Thus, inputting an optical signal to each bit-rate-fixed optoelectric converter 102 is always performed at a fixed bit rate. The electrical signals outputted from the optoelectric converters 102 are applied to the input terminals of the N×N cross-connect switch 103. These electrical signals are then sent to the input terminals of the respective electrooptic converter 104, each supporting only a fixed bit rate. The electrical signal is inputted to each electro-optic converter 104 at a fixed bit rate. Thereafter, the electrical signals are converted into optical signals via the electro-optic converters 104, then outputted as an output optical signal after multiplexed by the multiplexer 107. Finally, the multiplexed optical signals are transferred via a single optical fiber.

The conventional optical cross-connect device, as described in the preceding paragraph, has a problem in that a desired connection for data transfer is allowed only for a particular transfer format as the optical cross-connect device is internally equipped with fixed bit-rate optoelectric converters (or optical receivers) and fixed bit-rate electro-optic converters (or optical transmitters). That is, the conventional optical cross-connect device has no ability, known as "transparency," to cope with change in the transfer format or any variation in the bit rate. Hence, the conventional optical cross-connect device provides only a limited cross-connection in a fixed data network. As a result, there are problems associated with the multi-transfer requirements and the network management.

Another conventional optical cross-connect device is disclosed in Korean Patent Application No. 2000-28076 (Self-Healing Bit Rate Converting Device in Optical Transmission System) filed under the name of the assignee of the present invention. The Korean application provides a means to handle different bit rates in an optical receiver. In addition, the disclosed optical cross-connect device has a configuration, which includes a bit rate discriminating unit and a temperature sensing unit for each BICDR (Bit Rate Independent Clock and Data Recovery). As the performance of the BICDR transmitters and receivers are affected when operating at a considerably high temperature, the bit rate discriminating unit and the temperature sensing unit are operatively coupled to a central control unit to compensate for the temperature variation. However, the temperature of the BICDR transmitters and receivers may be different from one another. For this reason, it is necessary to control the respective bit rate discriminating unit of the BICDR transmitters and receivers in an independent fashion when determining the bit rate. Therefore, the present invention provides an improved optical cross-connect device capable of processing different bit rates without being affected by temperature variation.

SUMMARY OF THE INVENTION

The present invention is related to a bit-rate-independent optical cross-connect device in which the bit rate discriminating units for transmitters and receivers, and the temperature sensing unit are integrated on a switchboard.

The present invention is directed to a bit-rate-independent optical cross-connect device in which a self-healing bit rate change function is provided using an electrical switch to secure transparency for the bit rate change in a network.

In accordance with one aspect, the present invention provides in an optical transmission system, which includes a demultiplexer for demultiplexing an input optical signal into corresponding optical signals at different channels, and a multiplexer for multiplexing the optical signals outputted from the demultiplexer. The inventive optical cross-connect device includes:

N BICDR (Bit Rate Independent Clock and Data Recovery) receivers for receiving the associated optical signals outputted from the demultiplexer, for converting the associated optical signal into an electrical signal and reproducing clocks and data based on the bit rate of the electrical signal;

a switchboard including a cross-connect switch for receiving the respective output signal from the N BICDR receivers, N bit rate discriminating units for receiving the output signals from the N BICDR receivers, respectively, thus outputting bit rate discriminating signals associated with the N BICDR receivers, and a temperature sensing unit for outputting a temperature sensing signal; and, a central processing unit for receiving the bit rate discriminating signals from the N bit rate discriminating unit, along with the temperature sensing signal from the temperature sensing unit, for compensating each of the received bit rate discriminating signals with a temperature-dependent bit rate value read from a memory based on the temperature sensing signal, and for controlling the bit rate of the associated BICDR receiver based on the compensated bit-rate.

In accordance with another aspect, the present invention provides in an optical transmission system, which includes a demultiplexer for demultiplexing an input optical signal into optical signals of different channels and a multiplexer for multiplexing the optical signals outputted from the demultiplexer. The inventive optical cross-connect device includes:

N BICDR receivers for receiving the associated optical signals outputted from the demultiplexer, for converting the associated optical signal into an electrical signal and for reproducing clocks and data from the associated optical signal based on the bit rate of the electrical signal;

N BICDR transmitters for receiving the electrical signal outputted from the associated N BICDR receivers, for converting the electrical signal into an optical signal, and for reproducing clocks and data from the converted optical signal based on the bit rate of the electrical signal;

a switchboard including a cross-connect switch for receiving the electrical signal from the respective N BICDR receiver and routing the electrical signals along the intended path, thereby sending the electrical signals to the associated BICDR transmitters, respectively; 2N bit rate discriminating units for receiving the respective output signal from the N BICDR receivers and the respective output signals from the N BICDR transmitters, thereby outputting bit rate discriminating signals associated with the N BICDR receivers and the N BICDR transmitters, respectively, and a temperature sensing unit for outputting a temperature sensing signal; and, a central processing unit for receiving the bit rate discriminating signals from the 2N bit rate discriminating unit, along with the temperature sensing signal from the temperature sensing unit, for compensating each of the received bit rate discriminating signals with a temperature-dependent bit rate value read from a memory based on the temperature sensing signal, and for controlling the bit rate of the associated BICDR receiver or transmitter based on the compensated bit-rate.

BRIEF DESCRIPTION OF THE DRAWINGS

The above advantages of the present invention will become more apparent by describing in detail preferred embodiments thereof with reference to the attached drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
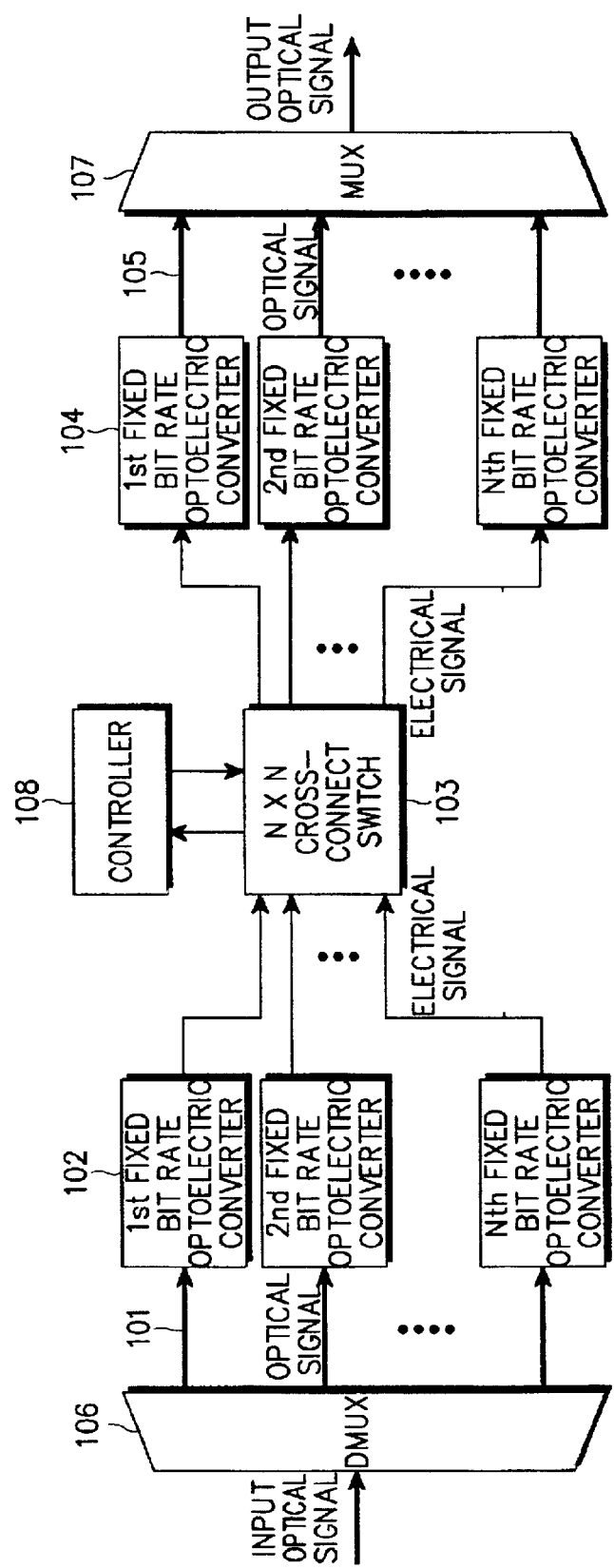
FIG. 1 is a block diagram illustrating an optical transmission system to which a conventional cross-connect device is applied.
Figure 2:
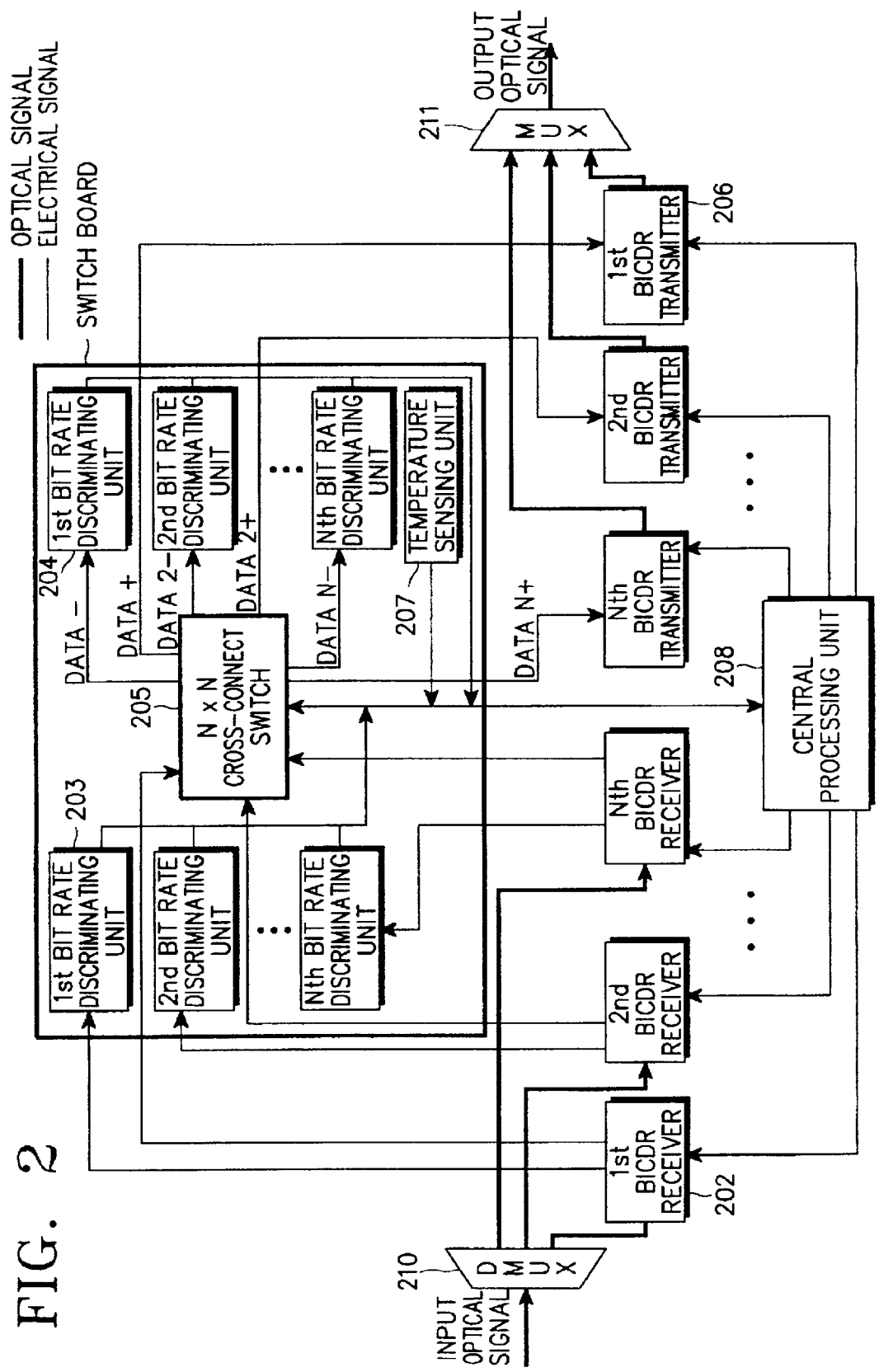
FIG. 2 is a block diagram illustrating an optical transmission system to which a cross-connect device according to a preferred embodiment of the present invention is applied.

FIG. 2 is a block diagram illustrating the configuration of an N×N cross-connect device employed in an optical transmission system in accordance with the present invention. As shown in FIG. 2, the optical transmission system includes a demultiplexer (DMUX) 210 for demultiplexing an input optical signal into a plurality of optical signal channels according to the wavelength; N BICDR receivers 202 for converting the respective optical signal channel outputted from the demultiplexer 210 into electrical signals; and, a switchboard including an N×N optical cross-connect switch 205 for receiving the electrical signals outputted from the BICDR receivers 202 and for outputting the received electrical signals to the intended path. The optical transmission system also includes N BICDR transmitters 206 for converting the electrical signals outputted from the respective output ports of the optical cross-connect switch 205 into optical signals, a multiplexer 211 for multiplexing the optical signals outputted from the BICDR transmitters 206, and a central processing unit 208 for controlling the overall flow of the electrical signals.

In operation, each BICDR receiver 202 receives an optical signal from the demultiplexer 210, then converts the received optical signal into an electrical signal. In addition, the BICDR receiver 202 generates a "PLL (Phase Locked Loop) loss of lock" signal based on a reference clock signal generated in response to the bit rate of the converted electrical signal of the selected channel signal for full recovery of the channel signal. Similarly, each BICDR transmitter 206 receives an electrical signal from the bit rate discriminating unit 204 and converts the received electrical signal into an optical signal, then the converted optical signal is applied to the multiplexer 211. The BICDR transmitter 206 also generates a "PLL loss of lock" signal based on a reference clock signal in response to the bit rate of the converted electrical signal for recovery of the channel signal.

Two output signals are generated from a limiting amplifier internally provided at each of N BICDR receivers 202. One of the output signals from each BICDR receiver 202 is applied to the associated N bit rate discriminating units 203 on the switchboard, whereas the other output signal is applied to the N×N optical cross-connect switch 205. The bit rate discriminating signals indicative of the bit rate of the converted electrical signals outputted from the respective N bit rate discriminating unit 203 are inputted to the central processing unit 208. It is noted that the process of determining the bit rate by the respective bit-rate discriminating unit (203 and 204) can be performed in a variety of ways. For example, the converted electrical signals can be separated into two parts. One part may be electrically delayed by a predetermined amount then multiplied to the undelayed signal to generate an output signal. The output signal can be averaged over a time period to determine the bit rate of the selected channel signal.

Meanwhile, N (−) data and N (+) data outputted from the respective output ports of the optical cross-connect switch 205 are sent to the N bit rate discriminating units 204 and the N BICDR transmitters 206, respectively. The bit rate discriminating signals indicative of the bit rate of the converted electrical signals from the respective bit-rate discriminating unit 204 and the temperature information detected by the temperature sensing unit 207 of the switchboard are forwarded to the central processing unit 208. The bit rate determined by the bit-rate discriminating units 203 and 204 is compensated for errors resulting from a temperature variation inside the optical cross-connect device based on the temperature level indicated by the temperature sensing unit 207. A temperature-dependent bit rate error is retrieved from a memory based on the temperature detected by the temperature sensing unit 207, then applied to the bit rate determined by the bit-rate discriminating unit 203 and 204. The processing unit 208 then sends a central signal for adjusting the bit rate of the associated BICDR receiver 202 or transmitter 206 based on the temperature-compensated bit rate. Accordingly, the BICDR receivers 202 and BICDR transmitters 206 can automatically conduct a bit rate change. As the switchboard has an integrated structure of the 2N bit rate discriminating units 203 and 204, the temperature sensing unit 207, and the optical cross-connect switch 205 with the ability to automatically conduct a desired bit rate change, the present invention provides a simple interface to the central processing unit 208 that is easier for enabling the operation of the central processing unit 208.

In accordance with the present invention, a self-healing bit rate change function is provided to a bit-rate-independent optical cross-connect device using an electrical switch, thereby securing a desired transparency for the bit rate change in a network. It is also possible to eliminate problems associated with a high sensitivity of the transmitter and receiver to a variation in temperature in the conventional art systems.

While this invention has been described in connection with what is presently considered the most practical and preferred embodiment, it is to be understood that the invention is not limited to the disclosed embodiment; to the contrary, it is intended to cover various modifications within the spirit and the scope of the appended claims.

What is claimed is:

1. An optical transmission system of the type having a demultiplexer for demultiplexing an input optical signal into optical signals of different channels, and a multiplexer for multiplexing the optical signals outputted from the demultiplexer, comprising:
   a plurality of BICDR (Bit Rate Independent Clock and Data Recovery) receivers for receiving the associated optical signals outputted from the demultiplexer, each BICDR receiver for converting the associated optical signal into an electrical signal and for reproducing clocks and data based on the bit rate of the electrical signal;
   a switchboard having a cross-connect switch for receiving the output signal from the respective BICDR receiver, the switchboard comprising:
      a plurality of bit rate discriminating units for receiving the output signals from the respective BICDR receivers to generate bit rate discriminating signals associated with the BICDR receivers; and,
      a temperature sensing unit for outputting a temperature sensing signal; and,
      a central processing unit for receiving the bit rate discriminating signals from the respective bit rate discriminating units and the temperature sensing signal from the temperature sensing unit, for compensating each received bit rate discriminating signal with a temperature-dependent bit rate value read from a memory in response to the temperature sensing signal, and for controlling the bit rate of each associated BICDR receiver based on the respective compensated bit rate discriminating signal.

2. The system of claim 1, wherein the bit rate discriminating signals each indicate the bit rate of the output signal from the respective BICDR receiver.

3. The system of claim 1, wherein the temperature sensing signal indicates the temperature inside the system.

4. An optical transmission system of the type having a demultiplexer for demultiplexing an input optical signal into optical signals of different channels, and a multiplexer for multiplexing the optical signals outputted from the demultiplexer, comprising:
   a plurality of BICDR receivers for receiving the associated optical signals outputted from the demultiplexer each BICDR receiver for converting the associated optical signal into an electrical signal and for reproducing clocks and data based on a bit rate of the electrical signal;
   a plurality of BICDR transmitters for receiving electrical signals outputted from each BICDR transmitter for converting the associated electrical signal into an optical signal and for reproducing clocks and data based on the bit rate of the electrical signal;
   the switchboard having a cross-connect switch for receiving the electrical signals from the respective BICDR receivers and for routing the electrical signals to the associated BICDR transmitters, respectively, the switchboard comprising:
      a plurality of bit rate discriminating units for receiving the output signals from the respective BICDR receivers to generate bit rate discriminating signals indicative of the bit rates of the output signals from the respective BICDR receivers;
      a plurality of bit rate discriminating units for receiving the output signals from the cross-connect switch to generate bit rate discriminating signals indicative of the bit rates of the output signals from the cross-connect switch; and,
      a temperature sensing unit for outputting a temperature sensing signal; and,
   a central processing unit for receiving the bit rate discriminating signals from the bit rate discriminating units, and the temperature sensing signal from the temperature sensing unit, for compensating each of the received bit rate discriminating signals with a temperature-dependent bit rate value read out from a memory in response to the temperature sensing signal, and for controlling the bit rate of each associated BICDR receiver or transmitter based on the respective compensated bit-rate discriminating signal.

5. The system of claim 4, wherein the temperature sensing signal indicates the temperature inside the system.

* * * * *